United States Patent [19]

Pate

[11] 4,037,810
[45] July 26, 1977

[54] PIPE BRACKET AND CLAMP

[75] Inventor: Harold T. Pate, Solon, Ohio

[73] Assignee: Indian Head Inc., New York, N.Y.

[21] Appl. No.: 648,468

[22] Filed: Jan. 12, 1976

[51] Int. Cl.² .............................................. F16L 3/22
[52] U.S. Cl. ......................... 248/68 CB; 24/73 SA; 24/81 CC; 248/74 R; 248/74 PB
[58] Field of Search ............ 248/68 R, 68 CB, 74 R, 248/74 PB, 74 B, 73; 24/16 PB, 73 CC, 73 SA, 73 AP, 73 PB, 81 CC, 243 AC, 248 CR, 249 R, 249 FP

[56] References Cited

U.S. PATENT DOCUMENTS

| 1,861,130 | 5/1932 | Mitchel ......................... 248/74 B |
| 2,413,772 | 1/1947 | Morehouse ................... 248/74 B X |
| 2,455,598 | 12/1948 | Michalenko ................... 248/74 B |
| 3,068,924 | 12/1962 | Summers ...................... 248/68 R X |
| 3,110,465 | 11/1963 | Sugarman et al. ............. 248/74 B |
| 3,126,185 | 3/1964 | Christman ..................... 248/74 R |
| 3,144,695 | 8/1964 | Budwig ....................... 248/74 PB X |
| 3,186,051 | 6/1965 | Waddell ...................... 248/68 CB X |
| 3,216,683 | 11/1965 | Girard ........................... 248/68 CB |
| 3,529,795 | 9/1970 | Van Niel .................... 248/74 PB X |
| 3,604,676 | 9/1971 | Weber .......................... 248/68 R |
| 3,802,655 | 4/1974 | Schuplin ...................... 248/74 R |
| 3,945,594 | 3/1976 | Burt ........................... 248/74 PB X |
| 3,982,304 | 9/1976 | Menshen ..................... 248/68 CB X |

FOREIGN PATENT DOCUMENTS

| 85,239 | 5/1965 | France .......................... 248/74 PB |
| 89,103 | 4/1967 | France .......................... 248/74 R |
| 1,301,661 | 8/1969 | Germany ...................... 24/73 PB |
| 1,147,914 | 4/1969 | United Kingdom ........... 24/73 AP |
| 1,029,718 | 5/1966 | United Kingdom ........... 248/74 R |
| 1,041,624 | 9/1966 | United Kingdom ........... 24/73 PB |

Primary Examiner—Roy D. Frazier
Assistant Examiner—Rodney H. Bonck
Attorney, Agent, or Firm—William R. Laney

[57] ABSTRACT

An improved pipe bracket and clamp for holding a pipe or conduit in a manner minimizing heat and sound transmission, preventing electrolysis or galvanic action and avoiding pipe rupture through thermal expansion and contraction. The clamp is preferably formed of a resilient synthetic resinous material in a unitary structure comprising a U-shaped body portion having a recess therein in which a toothed jaw portion is formed to receive and engage a pipe or conduit. A clamping portion is hingedly secured to the body portion by an integral flexible hinge and is adapted to fold about the hinge to enclose and engage the pipe or conduit in the recess by means of a corresponding toothed jaw portion formed on the clamping portion. A flange portion on the body portion includes an aperture which comes into alignment with a corresponding aperture in the clamping portion through which apertures a fastener may be received to clamp the pipe or conduit and secure it to a wall structure or the like. An alternate embodiment includes an integral cover structure for protecting the fastener from the adverse effects of corrosive or deleterious elements after the bracket is secured to the pipe or conduit.

18 Claims, 10 Drawing Figures

PIPE BRACKET AND CLAMP

BACKGROUND OF THE INVENTION

1. Field of the Invention

This invention relates generally to pipe or cable supports and more paricularly, but not by way of limitation, to a pipe or cable bracket having a combination clamp and support structure.

2. Description of the Prior Art

The prior art contains a number of teachings of different pipe clamps which have been developed in the past. Such clamps have been empolyed to engage or hold pipes in various manners and have been mounted in different ways. They have been constructed of various different materials. In spite of the diversity of such prior pipe clamp structures, it is considered that none of the prior art devices provide the advantages of the present invention in the area of pipe clamping and support.

The increasing use of thin walled copper or copper alloy tubing or pipe for hot water lines in various building structures, as well as the use of such conduits for cold water lines is readily apparent. Such copper pipe is commonly installed on studs and related members used above a foundation or slab in wall structures.

Such use of comparatively thin walled copper pipe is unquestionably advantageous from a number of standpoints. However, such use has also given rise to a number of problems. Since tubing is used as described above, frequently sound from the pipe will tend to be conducted from the pipe itself either directly to, or through the materials contacted by it to the wall structure to which the pipe is clamped. Such sound transmission is of course somewhat objectionable.

There is also the danger of galvanic action or electrolysis setting in the causing corrosion if such pipes should contact various dissimilar metals such as are used in conventional fasteners, such an nails or screws, in a building structure. Similarly, the use of metallic pipe clamps constructed of steel, or some other dissimilar metal, can also be expected to cause galvanic action or electrolysis. Galvanic action or electrolysis should of course be avoided to avoid the possibility of pipe damage and ultimate pipe replacement. Further, copper tubing or pipe is frequently employed in areas where it can be expected to convey heat by conduction to various parts of the building structure. Since such heat conduction can be objectionable, it is advantageous to space such tubing or pipe at a distance from the wall structure to minimize heat conduction therebetween.

For economic reasons, copper tubing or pipe used as described above should be as thin as reasonably possible. As the wall thickness of tubing or pipe decreases, the danger of such tubing or pipe rupturing as a result of the manner in which it is mounted and used increases. This is particularly true when hot water lines are formed of such tubing since such lines tend to thermally expand and contract a significant amount as they are heated and cooled depending upon the operation and use of the hot water system. Frequently, prior art pipe clamps have not been capable of firmly holding tubing or pipe in such a manner as to accommodate pipe movement or in such a manner as to permit thermal expansion and contraction of the tubing or pipe.

SUMMARY OF THE INVENTION

The present invention contemplates a pipe clamp comprising a relatively rigid body portion having a recess therein and with an aperture formed in said body portion. A relatively flexible hinge is formed on the body portion and relatively rigid clamping portion is connected to the hinge and includes an aperture formed therein, the clamping portion being adapted to fold about the hinge relative to the body portion whereby the apertures are positioned in mutual alignment.

An object of the invention is to provide a new and improved pipe clamp.

Another object of the invention is to provide an improved pipe clamp which is suitable for use in mounting copper and similar tubing pipe.

A further object of the invention is to provide a pipe clamp which minimizes the possibility of electrolysis or galvanic action, minimizes sound and heat transmission from the tubing or pipe to the building structure, and securely holds the tubing or pipe while allowing for thermal expansion and contraction thereof.

A still further object of the invention is to provide an improved pipe clamp which is relatively inexpensive and simple to manufacture and easy to install.

Other objects and advantages of the invention will be evident from the following detailed description when read in conjunction with the accompanying drawings.

DETAILED DESCRIPTION OF THE DRAWINGS

DESCRIPTION OF A PREFERRED EMBODIMENT

Figure 1:
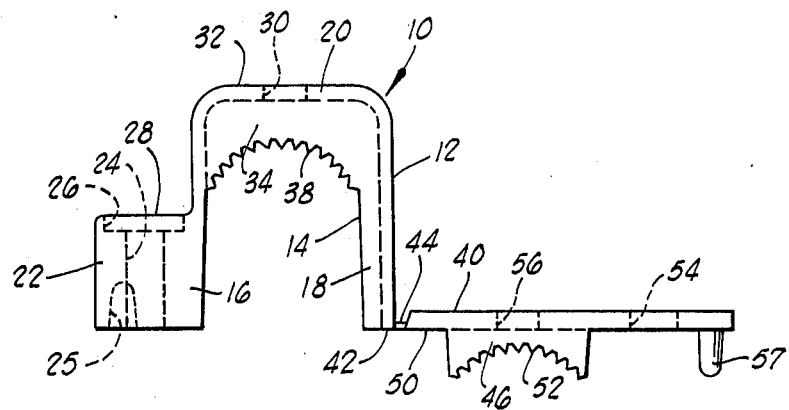
FIG. 1 is a side elevation view of one form of pipe clamp constructed in accordance with th present invention.

Referring now to the drawings and to FIGS. 1-6 in particular, a preferred embodiment of the pipe or conduit bracket and clamp of the present invention is generally designated by the reference character 10. The clamp 10 is of a unitary construction and is preferably moded of a resilient synthetic resinous material such as a polymer. One such suitable synthetic resinous material is polypropylene.

Figure 2:
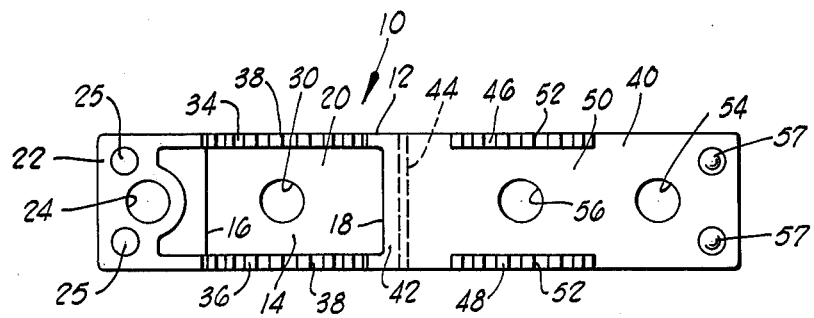
FIG. 2 is a bottom plan view of the pipe clamp of FIG. 1.
Figure 3:
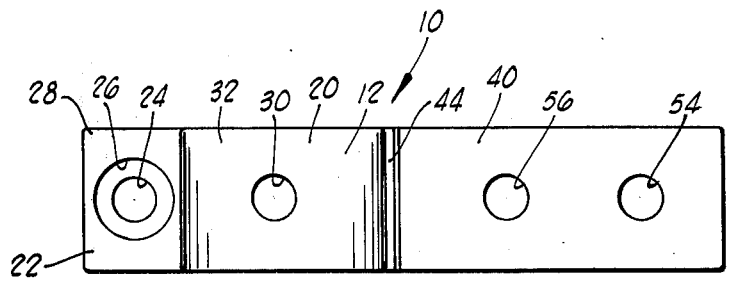
FIG. 3 is a top plan view of the pipe clamp of FIG. 1.

The clamp 10 comprises a realtively rigid, U-shaped body portion 12 having a recess 14 formed therein which recess is defined by a pair of substantially parallel leg portions 16 and 18 and an intermediate interconnecting portion 20 between the leg portions. A flange portion 22 of generally rectangular parallelepiped configuration is formed on the leg portion 16 and includes an aperture 24 formed therein which includes a counter bore 26 which intersects a shoulder 28 on the flange portion 22. A pair of spaced sockets 25 are formed in the oppostie side of the flange portion 22 from the counterbore 26 as best shown in FIGS. 1 and 2.

An aperture 30 is formed in the interconnecting portion 20 and communicates between the recess 14 and a substantially planar surface 32 formed on the exterior of the interconnecting portion 20. A pair of arcuately shaped jaw portions 34 and 36 are formed on the interior of the interconnecting portion 20 and extend between the leg portions 16 and 18 within the recess 14. The jaw portions 34 and 36 are each preferably equipped with a plurality of inwardly extending teeth or ridges 38 for securely engaging the exterior surface of the pipe or conduit to be engaged by the clamp 10.

The clamp 10 further includes a relatively rigid clamping portion 40 which extends outwardly from the body portion 12 at the free end 42 of the leg portion 18. At the juncture between the clamping portion 40 and the body portion 12 a groove 44 is formed in the clamping portion 40 providing a relatively flexible hinge conection between the clamping portion 40 and the body portion 12 formed of the previously mentioned resilient synthetic resinous material from which the clamp 10 is formed which permits the clamping portion to be readily folded relative to the body portion 12 at the juncture therebetween.

The clamping portion 40 includes a pair of arcuately shaped jaw portions 46 and 48 formed on one side 50 thereof, each jaw portion 46 and 48 including a plurality of radially inwardly extending teeth or ridges 52 formed thereon for securely engaging the exterior surface of a pipe or conduit to be engaged by the clamp 10. The jaw portions 46 and 48 are so positioned on the one side 50 of the clamping portion 40 that they will be received within the recess 14 of the body portion 12 when the clamping portion 40 is folded relative to the body portion 12 as clearly shown in both FIGS. 4 and 5.

The clamping portion 40 further includes an aperture 54 formed therein which lies in mutual alignment with the aperture 24 of the body portion 12 when the clamping portion 40 is folded relative thereto as described above and shown in FIGS. 4 and 5. An additional aperture 56 is formed in the clamping portion 40 intermediate the jaw protions 46 and 48 and intermediate the aperture 54 and the groove 44. At the free end of the clamping portion 40 which is remote from the groove 44, a pair of spaced locating pegs 57 are formed on the clamping portion, and are positioned for registration and engagement with the sockets 25.

It should be understood that the apertures 30 and 56 provide convenient means through which a suitable fastener, such as nail or screw, may be passed to preliminarily secure the clamp 10 to a wall structure 58 or the like prior to the final clamping of a pipe or conduit in a particular clamp 10.

Figure 4:
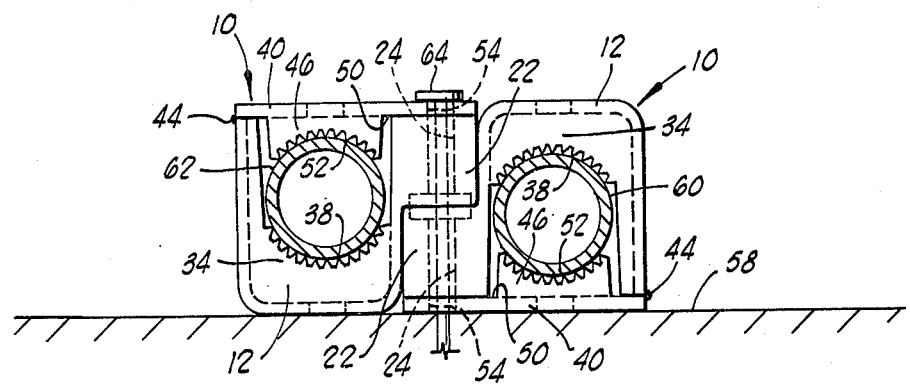
FIG. 4 is an elevation view of two pipe clamps as illustrated in FIG. 1 each disposed about a conduit and mutually secured to a wall structure.

As clearly shown in FIG. 4, a pipe or conduit 60 and a second pipe or conduit 62 may be conveniently secured to the wall structure 58 through the empolyment of a pair or conduit clamps 10. Each clamp 10 is folded about the respective pipe or conduit 60 and 62 and the apertures 24 and 54 of the two clamps 10 are mutually aligned thus permitting both pipes or conduits 60 and 62 to be secured to the wall structure 58 by single fastening member 64. The fastening member 64 is illustrated as a suitable nail but, it will also be understood, other suitable fastening means such as screws or bolts may be empolyed to secure the clamps 10 to the wall structure 58. It will also be understood that a single clamp 10 may be employed to secure a portion of a single conduit 60 as shown in FIG. 4 with the fastening member 64 extending only through the aperture 24 of the flange portion 22 and the aperture 54 of the clamping portion 40 of the single clamp 10. In either single or double clamp utilization of the type described, the locating pegs 57 engage the sockets 25 after the clamping portion 40 is folded about the hinge at the groove 44 so that proper registry and alignment of the apertures 54 and 24 is assured.

Figure 5:
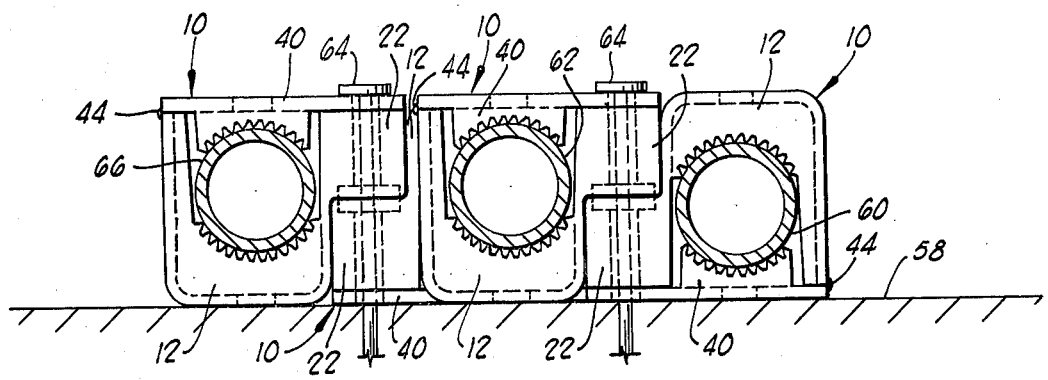
FIG. 5 is an elevation view of four pipe clamps as illustrated in FIG. 1 each disposed about a respective one of three conduits and mutually secured to a wall structure.
Figure 6:
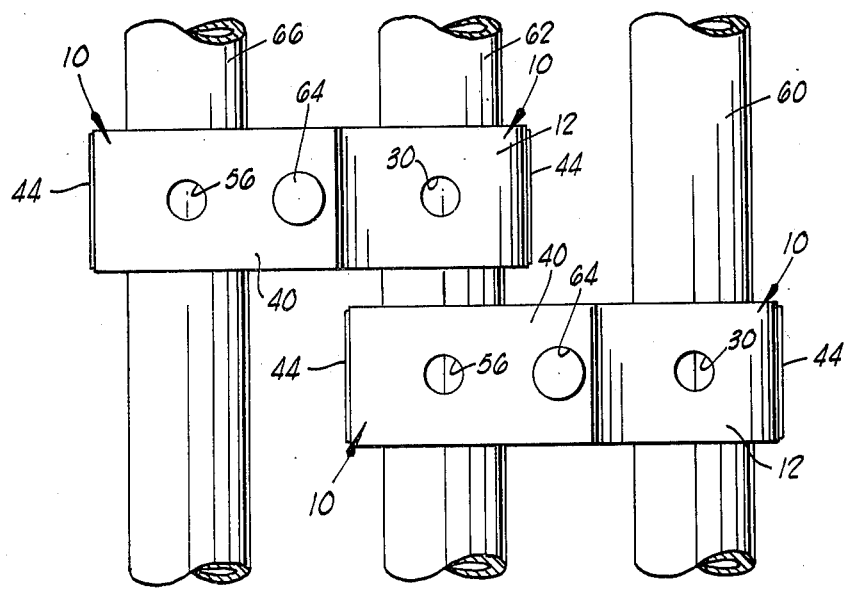
FIG. 6 is a top plan view of the pipe clamps and conduits of FIG. 5.
Figure 7:
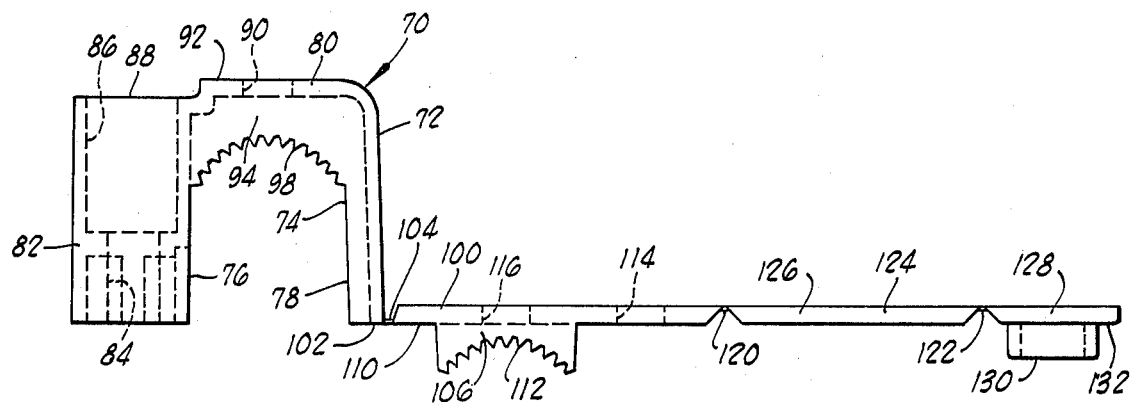
FIG. 7 is a side elevation view of an alternate form of pipe clamp constructed in accordance with the present invention.
Figure 8:
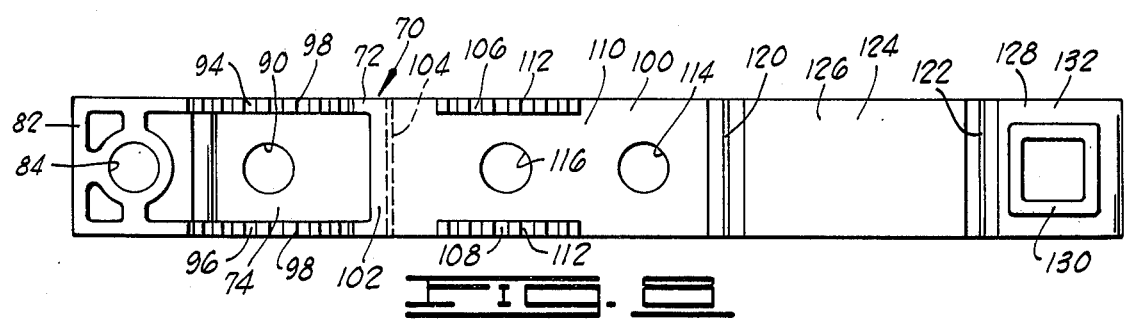
FIG. 8 is a bottom plan view of the pipe clamp of FIG. 7.
Figure 9:
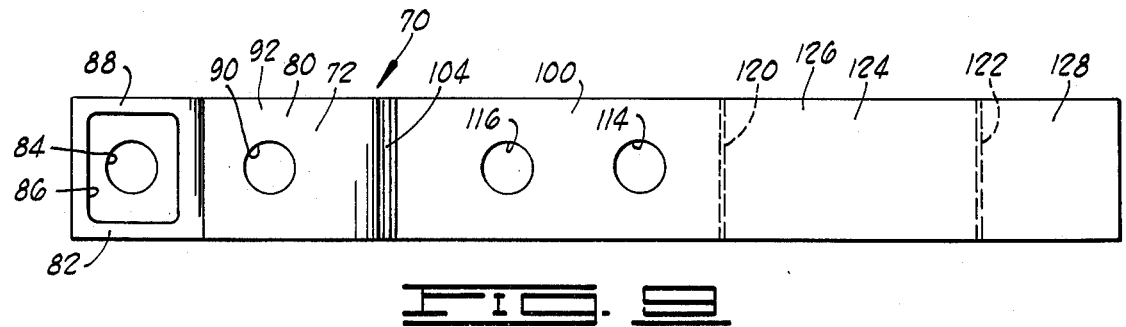
FIG. 9 is a top plan view of the pipe clamp of FIG. 7.

FIGS. 5 and 6 illustrate the employment of a plurality of pipe or conduit clamps 10 to secure the first and second pipes 60 and 62 and an addtional third pipe 66 in substantially parallel relation through the utilization of fastening members 64 in the manner as described above.

DESCRIPTION OF AN ALTERNATE EMBODIMENT

Referring now to FIGS. 7–10, an alternate form of pipe or conduit bracket clamp is illustrate therin which is constructued in accordance with the present invention and is generally designated by the reference character 70. The clamp 70 comprises a relatively rigid body portion 72 of generally U-shaped construction having a recess 74 formed therein which recess is defined by sustantially parallel leg portions 76 and 78 and an intermediate interconnecting portion 80 between the leg portions.

A flange portion 82 is formed on the leg portion 76 and includes an aperture 84 formed therein which includes and communicates with a concentric recess 86 which in turn communicates with a shoulder 88 formed on the upper portion of the flange portion 82.

An aperture 90 is formed in the interconnecting portion 80 of the body portion 72 and communicates between the recess 74 and a substantially planar surface 92 formed on the exterior of the body portion 72. A pair of arcuately shaped jaw portions 94 and 96 are formed on the interior of the inerconnecting portion 80 of the body portion 72 and extend between the leg portions 76 and 78 within the recess 74. The jaw portions 94 and 96 each include a plurality or radially inwardly extending teeth or ridges 98 formed thereon for securely engaging the exterior surface of the pipe or conduit which is to be engaged by the clamp 70.

The clamp 70 further includes a relatively rigid clamping portion 100 which is hingedly secure to the free end 102 of the leg portion 78 of the body portion 72. at the juncture between the clamping portion 100 and the body portion 72 a groove 104 is formed in the clamping portion 100 which provides a relatively flexible hinge connection between the clamping portion 100 and the body portion 72 which is formed by the resilient synthetic resinous material from which the clamp 70 is molded or otherwise formed. It will be understood that te material employed in the construction of the clamp 70 is identical to that previously described for the clamp 10.

The clamping portion 100 further includes a pair of arcuately shaped jaw portions 106 and 108 formed on one side 110 of the clamping portion 100, each jaw portion including a plurality of radially inwardly extending teeth or ridges 112 formed thereon for securely engaging the exterior of a pipe or conduit to be engaged by the clamp 70. The jaw portions 106 and 108 are so positioned on the one side 110 of the clamping portion 100 that they will be received within the recess 74 of the body portion 72 when the clamping portion 100 is folded relative to the body radially inwardly extending teeth or ridges 112 formed thereon for securely engaging the exterior of a pipe or conduit to be engaged by the clamp 70. The jaw portions 106 and 108 are so positioned on the one side 110 of the clamping portion 100 that they will be received within the recess 74 of the body portion 72 when the clamping portion 100 is folded relative to the body portion 72 as shown in FIG. 10.

Figure 10:
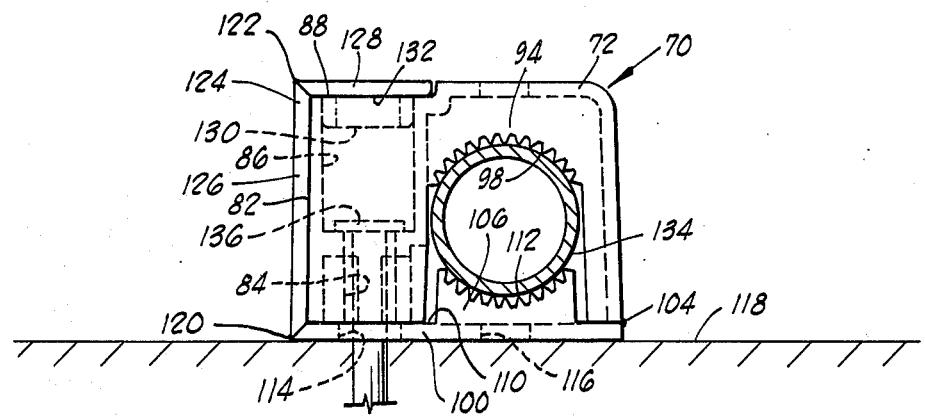
FIG. 10 is an elevation view of the pipe clamp of FIG. 7 disposed about a conduit and secured to a wall structure.

An aperture 114 is formed in the clamping portion 100 and is so positioned therein to be aligned with the aperture 84 in the flange portion 82 when the clamping portion 100 is folded relative to the body portion 72 as illustrated in FIG. 10. An additional aperture 116 is formed in the clamping portion 100 intermediate the jaw portions 106 and 108 and intermediate the aperture 114 and the groove 104. The aperture 116 provides means for receiving a fastening member such as a nail or screw therethrough to preliminarily secure the clamp 70 to a wall structure 118 or the like in advance of the actual final clamping of a conduit or pipe therein.

Additional transverse grooves 120 and 122 are formed in the one side 110 of the clamping portion 100 each providing a resilient hinge structure defining in part a cover structure 124 which includes an intermediate segment 126 extending between the grooves 120 and 122 and an outer cover segment 128 extending beyond the groove 122. A plug or boss 130 is formed on one side 132 of the outer cover segment 128 forming suitable closure means and is sized and shaped to be closely received and retained within the recess 86 of the aperture 84 in the flange portion 82 when the clamping portion 100 and cover structure 124 are folded about the flexible hinges 104, 120 and 124 as shown in FIG. 10.

The pipe or conduit clamp 70 may be employed to secure a conduit or pipe 134 to the wall structure 18, as shown in FIG. 10, by positioning the pipe 134 within the recess 74 of the body portion 72 and folding the clamping portion 100 relative to the body portion 72 until the jaw portions 94 and 96 of the body portion 72 and the jaw portions 106 and 108 of the clamping portion 100 engage the outer surface of the pipe 134 and the apertures 114 and 84 of the clamping portions 100 and body portion 72, respectively, are in alignment. A suitable fastening member 136, such as a nail, screw or bolt, is passed through the aligned apertures 84 and 114 and secures the clamp 70 and the pipe 134 to the wall structure 118 as shown in FIG. 10. The intermediate segment 126 is then folded against the exterior of the flange portion 82 about the flexible hinge 120 and the outer cover segment 128 is folded against the shoulder 88 of the flange portion 82 with the plug or boss 130 received and retained within the recess 86 thereby securing the cover structure 124 to the body portion 72 and closing the aperture 84 and recess 86 to the introduction of corrosive or deleterious materials therein which might attack the fastening member 136.

It will be seen from the foregoing detailed description that both embodiments of the pipe or conduit clamp of the present invention provide a number of advantages over the conventional pipe clamps currently employed. The clamps of the present invention are simple and economical to construct and use, light in weight, unitary in construction and are resistant to attack from most corrosive materials which might cause rust and corrosion to conventional metal clamps or deleterious galvanic action which might otherwise occur between a conventional metallic clamp and a dissimilar metal fastening member, conduit or pipe.

Further, the form of the clamps of the present invention and the material from which the clamps are made greatly reduces the conduction of heat and sound from pipe or conduit to the clamp and wall structure due to the thermal and sound insulating properties of the material, the minimum of contact surface between the clamp teeth and the conduit or pipe secured therein, and the spacing between the pipe or conduit and the wall structure. Still further, it will be seen that the construction of both embodiments of the clamp of the present invention readily permits thermal expansion and contraction of the conduit, pipe or tubing relative to the clamps without adversely affecting the clamping action between the clamp and the wall structure or the like to which the conduit or pipe is secured or damaging the conduit, pipe or tubing. The ridges or teeth of the clamps of the present invention are adapted to deform slightly to accommodate changes in diameter of the pipe or conduit occasioned by thermal or pressure resultant expansion of the pipe or conduit. Similarly, the spacing and orientation of the ridges or teeth of the clamps of the present invention permit linear dimensional changes in the pipe or conduit occasioned by thermal or pressure resultant expansion or contraction of the pipe or conduit without damage thereto.

Changes may be made in the combination and arrangement of parts or elements as heretofore set forth in the specificaton and shown in the drawings without departing from the spirit and scope of the invention as defined in the following claims.

What is claimed is:

1. A pipe clamp comprising:
   a body portion having a pipe-receiving recess therein and first aperture means therethrough;
   flexible hinge means on said body portion;
   a clamping portion connected to said hinge means and having second aperture means formed therein, said clamping portion being adapted to fold about said hinge means relative to said body portion to bring said first aperture means and second aperture means into mutual alignment for receiving a fastener member therethrough;
   cover means having one end flexibly connected to said clamping portion for extending across and blocking said first aperture means when said clamping portion is folded about said hinge means relative to said body portion;
   closure means on said cover means insertible in and registerable with a portion of said first aperture means; and
   a festening member extending through said second aperture means and into a portion of said first aperture means and protectively covered and blocked by said closure means to prevent exposure of the fastening member to unauthorized removal and to corrosive elements.

2. The pipe clamp as defined in claim 1 characterized further to include:
   second flexible hinge means interconnecting
      said clamping portion and said cover means for permitting hinged movement therebetween.

3. The pipe clamp as defined in claim 2 wherein said cover means is characterized further to include:

third flexible hinge means formed in said cover means intermediate said second hinge means and the end of said cover means which is opposite said one end thereof.

4. A compound pipe clamp assembly for clamping a plurality of pipes in substantially parallel relation to each other comprising:
- a first body portion having a recess therein defined in part by an internal pipe-engaging jaw portion;
- a first flange portion of generally rectangular parallelepiped shape projecting from one side of the body portion outside said recess;
- a first clamping portion removably covering said recess and including a second jaw portion thereon projecting into said recess to a position for cooperating with said first-mentioned jaw portion to frictionally engage the opposite sides of a pipe placed in said recess;
- a second body portion having a recess therein defined in part by an internal pipe-engaging jaw portion, and configured substantially identically to said first body portion;
- a second flange portion of generally rectangular parallelepiped configuration projecting from one side of the second body portion at a location outside said recess, said second flange portion being substantially identical in configuration to said first flange portion and including a flat side flatly abutting a side of said fist flange portion;
- a second clamping portion removably covering said recess of said second body portion and including a second jaw portion thereon projecting into said recess of said second body portion to a position for cooperating with said first-mentioned jaw portion of said second body portion to frictionally engage the opposite sides of a pipe placed in said recess of said second body portion, said second clamping portion being substantially identical in configuration to said first clamping portion; and
- fastener means extending through said first and second flange portions to interengage said first and second body portions, with a surface of said first body portion abutting a surface of said second flange portion, and a surface of said second body portion abutting a surface of said first flange portion, and to position said jaw portions to engage a pair of pipes extending parallel to each other.

5. The compound pipe clamp assembly as defined in claim 4 wherein:
- said first body portion, said first flange portion and said first clamping portion are formed of a unitary body of synthetic resinous material to form a first pipe clamp; and
- said second body portion, said second flange portion and said second clamping portion are formed of a second unitary body of synthetic resinous material to form a second pipe clamp. resinous material to form a first pipe clamp; and
- said second body portion, said second flange portion and said second clamping portion are formed of a second unitary body of synthetic resinous material to form a second pipe clamp.

6. The compound pipe clamp assembly as defined in claim 4 characterized further to include:
- first positioning aperture means formed in said first body portion for receiving a first positioning fastener therethrough to position said first body portion prior to engaging one of said pairs of pipes therein; and
- a second positioning aperture means formed in said second clamping portion for receiving a second positioning fastener therethough to position said second clamping portion prior to engaging the other of said pair of pipes in said second body portion.

7. The compound pipe clamp assembly as defined in claim 4 and further characterized as including:
- a first hinge interconnecting said first clamping portion with said first body portion at the side thereof opposite said side from which said flange portion projects; and
- a second hinge interconnecting said second clamping portion with said second body portion at the side thereof opposite said side from which said flange portion projects.

8. The compound pipe clamp assembly as defined in claim 4 wherein:
- said first flange portion includes an aperture formed therein;
- said first clamping portion includes an aperture formed therein, the aperture in said first clamping portion being positioned in mutual alignment with the aperture in said first flange portion when said first flange portion removably covers said recess of said first body portion;
- said second flange portion includes an aperture formed therein; and
- said second clamping portion includes an aperture formed therein, the aperture in said second clamping portion being positioned in mutual alignment with the aperture in said second flange portion when said second clamping portion removably covers the recess of said second body portion.

9. The compound pipe clamp assembly as defined in claim 8 wherein said fastener means is characterized further as extending through the mutually aligned apertures in said first and second flange portions and the mutually aligned apertures in said first and second clamping portions to interengage said first and second body portions and position said jaw portions to engage said pair of pipes extending parallel to each other.

10. A pipe clamp comprising:
- a body portion having a recess therein and having a fastener-receiving aperture through one side thereof communicating with said recess, said body portion defining a pair of spaced arcuate jaws within said recess and positioned on opposite sides of said fastener-receiving aperture to thereby space a pipe engaged by said jaws from the head of a fastener extended through said fastener-receiving aperture;
- a generally rectangular parallelepiped-shaped flange secured to one side of said body portion on the outside of said recess, and defining an aperture and a pair of sockets opening in the same direction as the recess in the body portion;
- flexible hinge means on said body portion on the opposite side thereof from said flange; and
- a clamping portion connected to said hinge means and having a pair of pegs projecting therefrom and an aperture therethrough, said pegs being configured and dimensioned to register with and engage said sockets, and said last-mentioned aperture being positioned in said clamping portion at a location to register with said aperture in said flange when said clamping portion is folded on said hinge means to close the recess in said body portion, said clamping portion extending in a plane on one side of said clamp and substantially parallel to said one side of said body portion when said clamping portion is in its recess closing position, said one side of said body portion being substantially monoplanar and extending parallel to said clamping portion in its recess closing position whereby fastening members can be optionally extended through one of said fastener-receiving apertures through said one side of said body portion and said aperture through said clamping portion to optionally secure said pipe clamp in flatly abutting contact with a supporting surface extended along either of two opposed sides of said pipe clamp.

11. A wrap-around pipe structure comprising:
a body portion including a pair of spaced legs having an opening therebetween for receiving a pipe between said legs;
a generally rectangular parallelepiped-shaped flange portion secured to one side of said body portion at, and along, one of said legs on the opposite side of said one leg from said opening, said flange portion having a fastener-accommodating passageway extending therethrough to facilitate projection of a fastener through said flange portion into a supporting structural member;
a wrap-around clamping portion removably extended across said legs to close said opening, around said flange portion on the side thereof opposite its side contiguous to said body portion, and across said fastener-accommodating passageway to close said passageway at one end thereof and protect the head of a fastener disposed in said fastener-accommodating passageway, said wrap-around clamping portion defining a fastener-accommodating aperture registering with the opposite end of the fastener-accommodating passageway in said generally rectangular parallelepiped-shaped flange portion; and
hinge means flexibly connecting said wrap-around clamping portion to said body portion.

12. The wrap-around pipe clamp structure as defined in claim 11 wherein said clamping portion is characterized further to include:
cover means having one end connected to said clamping portion for covering said fastener-accomodating passageway at one end thereof when said clamping portion is folded at said hinge means and is removably extended across said legs to close said opening, around said flange portion and across said fastener-accommodating passageway.

13. The wrap-around pipe clamp structure as defined in claim 12 characterized further to include:
second hinge means flexibly interconnecting said clamping portion and said cover means for permitting hinged movement therebetween.

14. The wrap-around pipe clamp structure as defined in claim 13 wherein said cover means is characterized further to include:
third flexible hinge means formed in said cover means intermediate said second hinge means and the end of said cover means which is opposite said one end connected to said clamping portion.

15. The wrap-around pipe clamp structure as defined in claim 14 wherein said cover means is characterized further to include:
closure means formed on the opposite end of said cover means for engaging one end of said fastener-accommodating passageway to close said passageway.

16. The wrap-around pipe clamp structure as defined in claim 11 characterized further to include:
positioning aperture means formed in said wrap-around clamping portion at a location opposite the opening between said spaced legs for receiving a positioning fastener therethrough to position said pipe clamp prior to engaging a pipe between the legs of said body portion with the opening between said legs covered by said wrap-around clamping portion.

17. A pipe clamp comprising:
a U-shaped body portion having
a pair of spaced legs;
a centrally apertured interconnecting portion extending between and joining said legs and defining therewith a pipe-receiving recess;
a pair of spaced jaw portions joined to said interconnecting portion at locations on opposite sides of the aperture in said interconnecting portion and joined to said legs for engaging a pipe positioned between said legs and said recess, and for spacing the pipe engaged thereby from said interconnecting portion and the recess therein whereby the pipe engaged by said jaw portions is spaced from the head of a fastening member extended through the aperture in said interconnecting portion; and
an apertured flange portion on the opposite side of one of said legs from said recess;
flexible hinge means connected to the free end of the other of said legs of said body portion; and
a clamping portion connected to said hinge means for pivotation on said body portion from an open position to a closure position closing said recess and extending across said apertured flange in a plane substantially parallel to the plane of said interconnecting portion whereby said pipe clamp includes two flat surfaces on the opposite sides thereof as defined by said interconnecting portion and said clamping portion, said clamping portion including
a first aperture positioned therein for alignment with the aperture in said apertured flange when said clamping portion is in its closure position whereby a fastening member may be extended through the aperture in said flange and the first aperture in said clamping portion in a direction substantially normal to the plane in which said clamping portion extends in its closure position;
a second aperture positioned between said first aperture therein and said flexible hinge means for alignment with the aperture in said interconnecting portion when said clamp portion is in its closure position and extends substantially parallel to said interconnecting portion whereby a fastening device for fastening said clamp to a supporting structure can optionally be extended through said aperture in said centrally apertured interconnecting portion or, in the opposite direction, through said second aperture in said clamping portion; and
a pair of spaced jaw portions secured to said clamping portion on opposite sides of said second aperture in said clamping portion and projecting into said recess for cooperation with said first-mentioned jaw portions when said clamping portion is in its closure position and a pipe is positioned in said recess and engaged by said first-mentioned and second-mentioned jaw portions, said pair of spaced jaw portions secured to said clamping portion spacing a pipe engaged thereby from the second aperture therein and from a fastening member extended through said second aperture.

18. A pipe clamp comprising:

a generally U-shaped body portion including:

a pair of substantially parallel leg portions defining therebetween a recess opening at one side of said body portion;

an interconnecting portion extending between the leg portions and disposed at the opposite side of said body from the opening to said recess, said interconnecting portion having a fastener-receiving aperture formed through a medial, substantially monoplanar, part thereof between said legs to facilitate extension of a clamp-positioning fastener therethrough prior to the time that a pipe to be clamped by said clamp is placed in said recess between said leg portions;

a pair of spaced jaw portions secured to said interconnecting portion at locations on opposite sides of said fastener-receiving aperture and each projecting from said interconnecting portion toward said recess opening, each of said jaw portions including a concavely arcuate edge opposite the edge thereof secured to said interconnecting portion, and each of said jaw portions having teeth on said concavely arcuate edge whereby a pipe engaged by said teeth is spaced by said jaw portions from said interconnecting portion and from the fastener-receiving aperture formed therethrough; and a flange portion projecting from one of said leg portions on the outside of said recess and defining a fastener-receiving aperture therethrough;

a clamping portion dimensioned to extend across said legs and the recess therebetween and across said flange portion in a plane substantially parallel to the substantially monoplanar medial part of said interconnecting portion at a time when said clamping portion is folded to a recess closing position, said clamping portion defining a first fastener-receiving aperture positioned therein to register with said fastener-receiving aperture through said flange portion when said clamping portion is extended across said legs and the recess therebetween and across said flange portion to close said recess, and said clamping portion further defining a second fastener-receiving aperture positioned therein to register with the opening to said recess and facilitating extension of a fastener through said second fastener-receiving aperture in said clamping portion in a direction opposite to the direction of extension of a fastener through said fastener-receiving aperture in said medial part of said interconnecting portion for location of said pipe clamp prior to the time that a pipe is engaged by said clamp, said clamping portion further including a second pair of spaced jaw portions disposed on opposite sides of said second fastener-receiving aperture through said clamping portion and projecting from said clamping portion into said recess toward said first-mentioned jaw portions when said clamping portion is extended across said legs and the recess therebetween and across said flange portion in a plane substantially parallel to the medial part of said interconnecting portion whereby said second pair of spaced jaw portions is positioned and dimensioned to space a pipe engaged thereby from said second fastener-receiving aperture in said clamping portion; and a hinge interconnecting said clamping portion with one of the leg portions of said generally U-shaped body portion to facilitate movement of said clamping portion between an open position and a closing position in which said clamping portion extends across said legs and the recess therebetween and across said flange portion in a plane substantially parallel to said medial part of said interconnecting portion.

* * * * *

UNITED STATES PATENT OFFICE
CERTIFICATE OF CORRECTION

Patent No. 4,037,810          Dated July 26, 1977

Inventor(s) Harold T. Pate

It is certified that error appears in the above-identified patent and that said Letters Patent are hereby corrected as shown below:

Column 1, line 13, change "empolyed" to --employed-- ;

Column 1, line 36, delete "the" ;

Column 1, line 38, change "an" to --as-- ;

Column 2, line 29, change "th" to --the-- ;

Column 3, line 5, change "oppostie" to --opposite-- ;

Column 3, lines 23 and 24, change "conection" to --connection-- ;

Column 3, line 47, change "protions" to --portions-- ;

Column 4, line 2, change "empoyled" to --employed-- ;

Column 4, line 23, change "therin" to --therein-- ;

Column 4, line 45, change "or" to --of-- ;

Column 4, line 50, change "secure" to --secured-- ;

Column 4, line 52, capitalize "at" ;

Column 4, line 59, change "te" to --the-- ;

Column 5, beginning with line 4, after "body" delete the section beginning with the word "radially" and up to and including the word "body" in line 11.

UNITED STATES PATENT OFFICE
CERTIFICATE OF CORRECTION

Patent No. 4,037,810          Dated July 26, 1977

Inventor(s) Harold T. Pate

It is certified that error appears in the above-identified patent and that said Letters Patent are hereby corrected as shown below:

Column 6, line 23, change "expansionof" to --expansion of-- ;

Column 7, line 30, change "fist" to --first-- ;

Column 7, beginning with line 58, after "clamp." delete the section beginning with the word "resinous" and up to and including the word "clamp." in line 63;

Column 8, line 3, delete "a" .

Signed and Sealed this

Eighteenth Day of October 1977

[SEAL]

Attest:

RUTH C. MASON
*Attesting Officer*

LUTRELLE F. PARKER
*Acting Commissioner of Patents and Trademarks*